US011050549B2

(12) United States Patent
Zhang et al.

(10) Patent No.: US 11,050,549 B2
(45) Date of Patent: *Jun. 29, 2021

(54) BLOCKCHAIN-BASED TRANSACTION METHOD AND APPARATUS, AND REMITTER DEVICE

(71) Applicant: Advanced New Technologies Co., Ltd., Grand Cayman (KY)

(72) Inventors: Wenbin Zhang, Hangzhou (CN); Baoli Ma, Hangzhou (CN)

(73) Assignee: Advanced New Technologies Co., Ltd., George Town (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/079,356

(22) Filed: Oct. 23, 2020

(65) Prior Publication Data
US 2021/0058230 A1 Feb. 25, 2021

Related U.S. Application Data

(63) Continuation of application No. PCT/CN2019/101104, filed on Aug. 16, 2019.

(30) Foreign Application Priority Data

Sep. 30, 2018 (CN) .......................... 201811160480.2

(51) Int. Cl.
*H04L 9/00* (2006.01)
*G06Q 20/40* (2012.01)
(Continued)

(52) U.S. Cl.
CPC ............. *H04L 9/008* (2013.01); *G06Q 20/40* (2013.01); *H04L 9/0618* (2013.01);
(Continued)

(58) Field of Classification Search
CPC ......... H04L 9/008; H04L 9/0869; H04L 9/30; H04L 9/0618; H04L 2209/38;
(Continued)

(56) References Cited

U.S. PATENT DOCUMENTS 7,568,615 B2    8/2009   Corona et al.
8,051,007 B2   11/2011   Omidyar
(Continued)

FOREIGN PATENT DOCUMENTS

CN    106296138 A    1/2017
CN    106549749 A    3/2017
(Continued)

OTHER PUBLICATIONS

Wichs et al., Monday, Jul. 6, 2015, "Fully Homomorphic Encryption and Signatures" pp. 1-23.*
(Continued)

*Primary Examiner* — Jung W Kim
*Assistant Examiner* — Thomas Ho
(74) *Attorney, Agent, or Firm* — Seed IP Law Group LLP

(57) ABSTRACT

Implementations of the present specification provide a blockchain-based transaction method and apparatus, and a remitter device. The method includes: calculating a transaction amount commitment, a first commitment random number ciphertext, and a second commitment random number ciphertext; and submitting transaction data to the blockchain, the transaction data including the transaction amount commitment, the first commitment random number ciphertext, and the second commitment random number ciphertext, for the transaction amount commitment and the first commitment random number ciphertext to be recorded into a remitter account, and the transaction amount commitment and the second commitment random number ciphertext to be recorded into a remittee account.

20 Claims, 7 Drawing Sheets

(51) Int. Cl.
| | |
|---|---|
| *H04L 9/06* | (2006.01) |
| *H04L 9/08* | (2006.01) |
| *H04L 9/30* | (2006.01) |
| *G06Q 20/38* | (2012.01) |

(52) U.S. Cl.
CPC .............. *H04L 9/0869* (2013.01); *H04L 9/30* (2013.01); *G06Q 20/3823* (2013.01); *H04L 2209/38* (2013.01)

(58) Field of Classification Search
CPC .............. G06Q 20/40; G06Q 20/3823; G06Q 20/3829; G06F 21/6245
See application file for complete search history.

(56) References Cited

U.S. PATENT DOCUMENTS

| | | | |
|---|---|---|---|
| 8,630,422 | B2* | 1/2014 | Gentry .................... H04L 9/008 380/285 |
| 9,569,771 | B2 | 2/2017 | Lesavich et al. |
| 9,774,578 | B1 | 9/2017 | Ateniese et al. |
| 9,990,504 | B1 | 6/2018 | Chapman et al. |
| 10,022,613 | B2 | 7/2018 | Tran et al. |
| 10,057,255 | B2 | 8/2018 | Votaw et al. |
| 10,148,646 | B2 | 12/2018 | Votaw et al. |
| 10,163,080 | B2 | 12/2018 | Chow et al. |
| 10,262,351 | B2 | 4/2019 | Boemi et al. |
| 10,270,599 | B2 | 4/2019 | Nadeau et al. |
| 10,275,739 | B2 | 4/2019 | Hanis et al. |
| 10,333,706 | B2 | 6/2019 | Smith et al. |
| 10,339,523 | B2 | 7/2019 | McDonough et al. |
| 10,846,372 | B1 | 11/2020 | Jayachandran et al. |
| 2004/0260926 | A1 | 12/2004 | Arditti Modiano et al. |
| 2009/0136033 | A1* | 5/2009 | Sy ............................ H04L 9/008 380/255 |
| 2009/0177591 | A1 | 7/2009 | Thorpe et al. |
| 2010/0078471 | A1 | 4/2010 | Lin et al. |
| 2010/0142704 | A1 | 6/2010 | Camenisch et al. |
| 2013/0073432 | A1 | 3/2013 | Mulholland |
| 2013/0170640 | A1* | 7/2013 | Gentry .................. H04L 9/3093 380/30 |
| 2013/0230168 | A1 | 9/2013 | Takenouchi |
| 2013/0238491 | A1 | 9/2013 | Bouey et al. |
| 2013/0254098 | A1 | 9/2013 | Holland |
| 2015/0088756 | A1 | 3/2015 | Makhotin et al. |
| 2016/0078431 | A1 | 3/2016 | Ramachandran et al. |
| 2016/0162897 | A1 | 6/2016 | Feeney |
| 2016/0253663 | A1 | 9/2016 | Clark et al. |
| 2016/0260160 | A1 | 9/2016 | Cheng et al. |
| 2016/0261411 | A1 | 9/2016 | Yau |
| 2016/0275461 | A1 | 9/2016 | Sprague et al. |
| 2016/0314462 | A1 | 10/2016 | Hong et al. |
| 2016/0342978 | A1 | 11/2016 | Davis et al. |
| 2016/0358165 | A1 | 12/2016 | Maxwell |
| 2017/0046698 | A1 | 2/2017 | Haldenby et al. |
| 2017/0048209 | A1 | 2/2017 | Lohe et al. |
| 2017/0076286 | A1 | 3/2017 | Castinado et al. |
| 2017/0124483 | A1 | 5/2017 | Huang |
| 2017/0149563 | A1 | 5/2017 | Camenisch et al. |
| 2017/0154331 | A1 | 6/2017 | Voorhees |
| 2017/0228822 | A1 | 8/2017 | Creighton, IV et al. |
| 2017/0236123 | A1 | 8/2017 | Ali et al. |
| 2017/0243241 | A1 | 8/2017 | Boutelle et al. |
| 2017/0289111 | A1* | 10/2017 | Voell ........................ H04L 9/14 |
| 2017/0316479 | A1 | 11/2017 | Kurian |
| 2017/0330179 | A1 | 11/2017 | Song et al. |
| 2017/0364705 | A1 | 12/2017 | Villars |
| 2017/0366357 | A1 | 12/2017 | Pattanaik et al. |
| 2018/0041345 | A1 | 2/2018 | Maim |
| 2018/0089644 | A1 | 3/2018 | Chen et al. |
| 2018/0205555 | A1 | 7/2018 | Watanabe et al. |
| 2018/0253702 | A1 | 9/2018 | Dowding |
| 2018/0349894 | A1 | 12/2018 | Patrinos et al. |
| 2018/0365688 | A1 | 12/2018 | He et al. |
| 2018/0365691 | A1 | 12/2018 | Sanders et al. |
| 2019/0005470 | A1 | 1/2019 | Uhr et al. |
| 2019/0020629 | A1 | 1/2019 | Baird, III et al. |
| 2019/0036712 | A1 | 1/2019 | Qiu |
| 2019/0043043 | A1 | 2/2019 | Saraniecki et al. |
| 2019/0080392 | A1* | 3/2019 | Youb ........................ G06F 21/64 |
| 2019/0164153 | A1 | 5/2019 | Agrawal et al. |
| 2019/0182027 | A1* | 6/2019 | Kipnis .................. H04L 9/3093 |
| 2019/0228407 | A1 | 7/2019 | Wu |
| 2019/0236300 | A1 | 8/2019 | Guo et al. |
| 2019/0349190 | A1 | 11/2019 | Smith et al. |
| 2019/0358515 | A1 | 11/2019 | Tran et al. |
| 2019/0385162 | A1 | 12/2019 | Zhang et al. |
| 2019/0394019 | A1* | 12/2019 | Gao .......................... H04L 9/30 |
| 2020/0028693 | A1 | 1/2020 | Wu et al. |
| 2020/0074459 | A1* | 3/2020 | Ma ........................ G06Q 20/065 |
| 2020/0150994 | A1 | 5/2020 | Thompson et al. |
| 2020/0279253 | A1* | 9/2020 | Ma ........................ G06Q 20/065 |

FOREIGN PATENT DOCUMENTS

| | | |
|---|---|---|
| CN | 106845960 A | 6/2017 |
| CN | 106982205 A | 7/2017 |
| CN | 107180353 A | 9/2017 |
| CN | 107294709 A | 10/2017 |
| CN | 103903129 B | 11/2017 |
| CN | 107360001 A | 11/2017 |
| CN | 107392603 A | 11/2017 |
| CN | 107666388 A | 2/2018 |
| CN | 107679976 A | 2/2018 |
| CN | 107833135 A | 3/2018 |
| CN | 108009441 A | 5/2018 |
| CN | 108021821 A | 5/2018 |
| CN | 108335106 A | 7/2018 |
| CN | 108390762 A | 8/2018 |
| CN | 108418689 A | 8/2018 |
| CN | 108418783 A | 8/2018 |
| CN | 108711105 A | 10/2018 |
| CN | 108764874 A | 11/2018 |
| CN | 109034840 A | 12/2018 |
| CN | 109583886 A | 4/2019 |
| CN | 109584055 A | 4/2019 |
| EP | 3576033 A1 | 12/2019 |
| JP | 2018007168 B | 1/2018 |
| RU | 2663476 C2 | 8/2018 |
| TW | 201732705 A | 9/2017 |
| TW | 201830302 A | 8/2018 |
| TW | I631518 B | 8/2018 |
| WO | WO 2012067214 A1 | 5/2012 |
| WO | WO 2016200885 A1 | 12/2016 |
| WO | WO 2017011601 A1 | 1/2017 |
| WO | WO 2017054985 A1 | 4/2017 |
| WO | WO 2017095833 A1 | 6/2017 |
| WO | WO 2017218983 A1 | 12/2017 |
| WO | WO 2018022132 A1 | 2/2018 |
| WO | WO 2018076762 A1 | 5/2018 |
| WO | WO 2018137316 A1 | 8/2018 |
| WO | WO 2018229631 A1 | 12/2018 |
| WO | WO 2018231397 A1 | 12/2018 |
| WO | WO 2019040855 A1 | 2/2019 |

OTHER PUBLICATIONS

Jens Groth, Jan. 3, 2009, "Homomorphic Trapdoor Commitments to Group Elements", pp. 1-12.*

George Samman, Sep. 11, 2016, "The Trend Towards Blockchain Privacy: Zero Knowledge Proofs" https://www.coindesk.com/trend-towards-blockchain-privacy-zero-knowledge-proofs.*

Alonso et al., "Monero—Privacy in the Blockchain," IACR, May 31, 2018.

Bünz et al., " Bulletproofs: Short Proofs for Confidential Transactions and More," 2018 IEEE Symposium on Security and Privacy (SP), San Francisco, CA, pp. 1-45, (2018).

Cecchetti et al., "Solidus: Confidential Distributed Ledger Transactions via PVORM," International Association for Cryptologic Research, Apr. 10, 2017 (28 pp.).

Franca, "Homomorphic Mini-blockchain Scheme," Apr. 24, 2015, retrieved from: http://pdfs.semanticscholar.org/ab9f/

(56) References Cited

OTHER PUBLICATIONS b027061fb4aa8ed8017d63002f586a18eab6.pdf, retrieved on Sep. 20, 2019 (17 pages).
Halpin et al., "Introduction to Security and Privacy on the Blockchain," 2017 IEEE European Symposium on Security and Privacy Workshops (EuroS&PW), Paris, pp. 1-3, doi: 10. 1109/EuroSPW.2017.43, (2017).
Kaaniche et al., "BDUA: Blockchain-Based Data Usage Auditing," 2018 IEEE 11th International Conference on Cloud Computing (Cloud), San Francisco, CA, pp. 630-637, doi: 10.1109/CLOUD.2018.00087, (2018).
Ma et al., "An Efficient NIZK Scheme for Privacy-Preserving Transactions over Account-Model Blockchain," IACR, International Association for Cryptologic Research, Dec. 22, 2017, retrieved from the internet: http://eprin1.iacr. Jrg/2017/1239.pdf, retrieved on Dec. 22, 2017 (26 pages).
Narula et al., "zkLedger: Privacy-Preserving Auditing for Distributed Ledgers", 15th Usenix Symposium on Networked Systems and Design and Implementation (NSDI '18), Apr. 9-11, 2018, pp. 65-80.
Poon et al., "The Bitcoin Lightning Network: Scalable Off-Chain Instant Payments," Jan. 14, 2016, pp. 1-59.
Rectinajh, "Ethernet Square white book", Jianshu, retrieved from: https:/www.jianshu.com/p/a4e32c50262a, Jan. 18, 2018, English machine translation (40 pages).
Sun et al., "RingCT 2.0: A Compact Accumulator-Based (Linkable Ring Signature) Protocol for Blockchain Cryptocurrency Monero," Aug. 12, 2017, International Conference on Computer Analysis of Images and Patterns, CAIP 2017: Computer Analysis of Images and Patterns, pp. 456-474 (20 pp.).
Tschorsch et al., "Bitcoin and Beyond: A Technical Survey on Decentralized Digital Currencies," in IEEE Communications Surveys & Tutorials, vol. 18, No. 3, pp. 2084-2123, thirdquarter 2016, doi: 10. 1109/COMST.2016.2535718, (2016).
Yuki Yasusaka, et al., "A Privacy-preserving Pre-Consensus Protocol for Blockchain", Computer Security Symposium 2018 Proceedings, Information Processing Society of Japan, Oct. 15, 2018, (9 pages).

\* cited by examiner

BLOCKCHAIN-BASED TRANSACTION METHOD AND APPARATUS, AND REMITTER DEVICE

TECHNICAL FIELD

Implementations of the present specification relate to the field of computer technologies, and particularly, to a blockchain-based transaction method and apparatus, and a remitter device.

BACKGROUND

The blockchain technology is a distributed database technology that protects data from being tampered with and forged by using cryptography and consensus mechanisms. With the development of computer and Internet technologies, thanks to advantages such as decentralization, openness and transparency, tamper-resistance, and trustiness, the blockchain technology is highly favored and is widely applied to many fields such as smart contracts, securities transactions, E-commerce, the Internet of Things, social communication, file storage, proof of existence, identity verification, and equity crowdfunding.

Currently, when the blockchain technology is applied to transaction scenarios, because transaction information needs to be sent to the blockchain for verification, implementation, and chaining-on, the transaction information is at risk of being leaked to a third party unrelated to the transaction.

There is a need of a technical solution for realizing privacy protection in a transaction process.

SUMMARY

The implementations of the present specification provide a blockchain-based transaction method and apparatus, and a remitter device, to achieve, among others, privacy protection without interaction with a remittee device.

An implementation of the present specification provides a blockchain-based transaction method, including: calculating a transaction amount commitment based on a commitment random number and a transaction amount; obtaining a first commitment random number ciphertext by encrypting the commitment random number based on a homomorphic encryption public key of a remitter account and the transaction amount using a homomorphic encryption algorithm; obtaining a second commitment random number ciphertext by encrypting the commitment random number based on a homomorphic encryption public key of a remittee account and the transaction amount using the homomorphic encryption algorithm; and submitting transaction data to the blockchain, the transaction data including the transaction amount commitment, the first commitment random number ciphertext, and the second commitment random number ciphertext, for the transaction amount commitment and the first commitment random number ciphertext to be recorded into the remitter account, and the transaction amount commitment and the second commitment random number ciphertext to be recorded into the remittee account.

An implementation of the present specification provides a blockchain-based transaction apparatus, including: a calculation unit, configured to calculate a transaction amount commitment based on a commitment random number and a transaction amount; a first encryption unit, configured to obtain a first commitment random number ciphertext by encrypting the commitment random number based on a homomorphic encryption public key of a remitter account and the transaction amount using a homomorphic encryption algorithm; a second encryption unit, configured to obtain a second commitment random number ciphertext by encrypting the commitment random number based on a homomorphic encryption public key of a remittee account and the transaction amount using the homomorphic encryption algorithm; and a submission unit, configured to submit transaction data to the blockchain, the transaction data including the transaction amount commitment, the first commitment random number ciphertext, and the second commitment random number ciphertext, for the transaction amount commitment and the first commitment random number ciphertext to be recorded into the remitter account, and the transaction amount commitment and the second commitment random number ciphertext to be recorded into the remittee account.

An implementation of the present specification further provides a remitter device, including: a memory, configured to store computer instructions; and a processor, configured to execute the computer instructions to implement the method described in any of the implementations of the present specification.

It can be understood from the technical solutions provided in the implementations of the present specification, in the implementations of the present specification, the transaction amount commitment, the first commitment random number ciphertext, and the second commitment random number ciphertext can be obtained by using the commitment mechanism and the homomorphic encryption mechanism. The transaction amount commitment, the first commitment random number ciphertext, and the second commitment random number ciphertext can be submitted to the blockchain, for the transaction amount commitment and the first commitment random number ciphertext to be recorded into the remitter account, and the transaction amount commitment and the second commitment random number ciphertext to be recorded into the remittee account. On the one hand, privacy protection can be realized for transaction information such as the transaction amount by using the commitment mechanism and the homomorphic encryption mechanism. On the other hand, the transaction can be smoothly completed in the blockchain without the remittee device by submitting the transaction amount commitment, the first commitment random number ciphertext, and the second commitment random number ciphertext to the blockchain. Therefore, the implementation can realize privacy protection under a non-interactive condition.

BRIEF DESCRIPTION OF DRAWINGS

To describe the technical solutions in the implementations of the present specification or in the existing technology more clearly, the following outlines the accompanying drawings for illustrating such technical solutions. Clearly, the accompanying drawings outlined below are some implementations of the present specification and a person skilled in the art can derive other drawings from such accompanying drawings without creative efforts.

DESCRIPTION OF IMPLEMENTATIONS

The descriptions herein clearly and comprehensively describe the technical solutions in the implementations of the present specification with reference to the accompanying drawings in the implementations of the present specification. Clearly, the described implementations are merely some example implementations rather than all of the implementations of the present specification. All other implementations obtained by a person of ordinary skill in the art based on the implementations of the present specification without creative efforts shall fall within the protection scope of the present specification.

Figure 1:
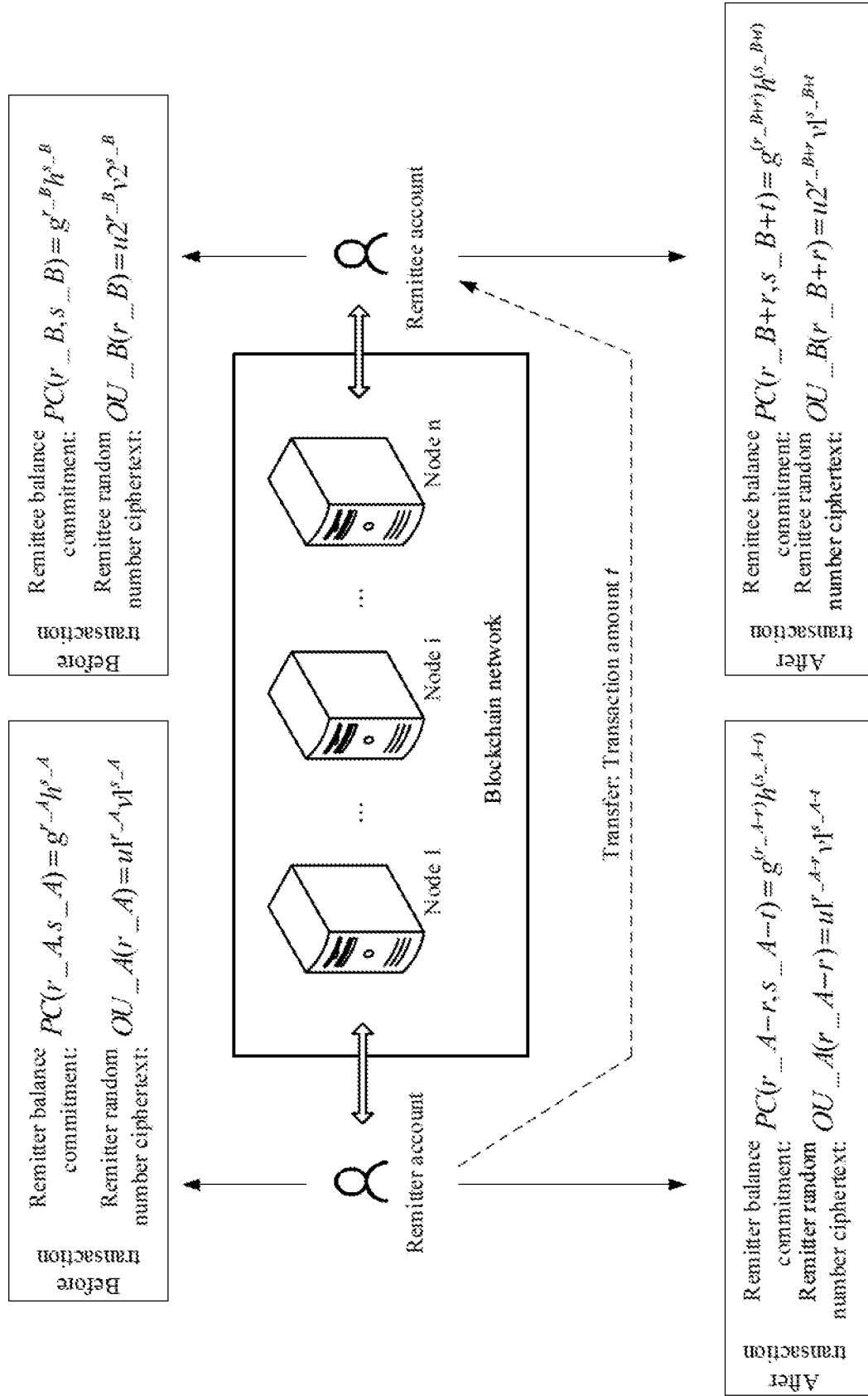
FIG. 1 is a schematic diagram illustrating blockchain-based transaction implementation according to an implementation of the present specification.
Figure 2:
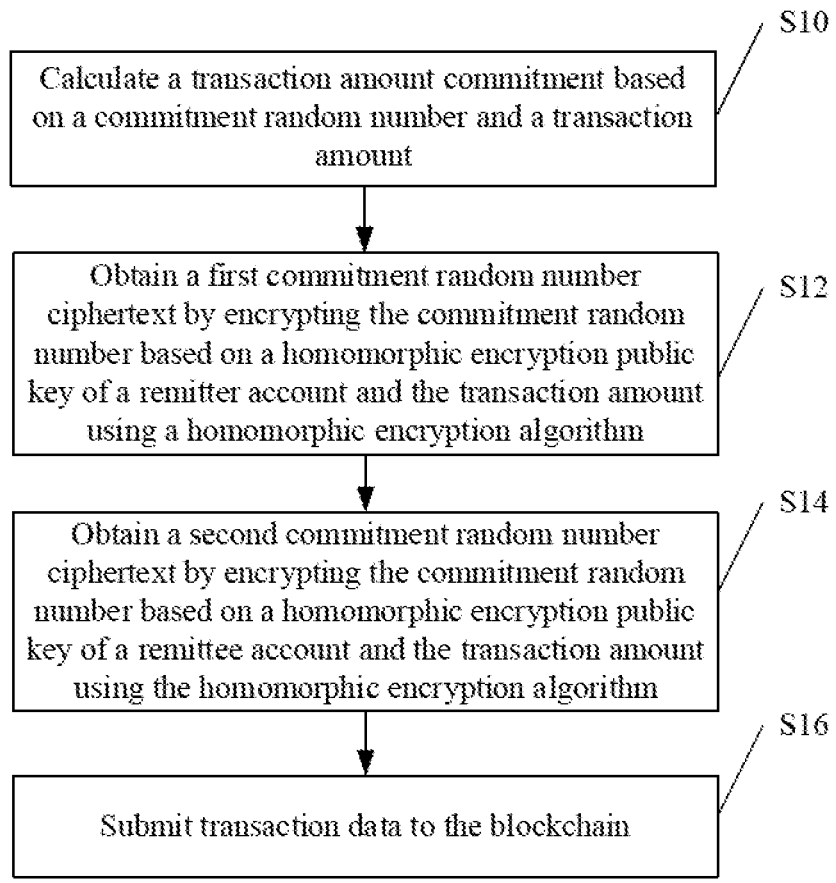
FIG. 2 is a flowchart illustrating a blockchain-based transaction method according to an implementation of the present specification.

Referring to FIG. 1 and FIG. 2, an implementation of the present specification provides a blockchain-based transaction method.

In this implementation, the blockchain can be a distributed ledger that organizes multiple pieces of block data in a chain structure based on a time sequence, and ensures security, traceability, and tamper-resistance by using a cryptography algorithm. The blockchain can include a public blockchain, a consortium blockchain, a private blockchain, etc. The blockchain can be implemented based on a blockchain network. The blockchain network can include a peer-to-peer network (P2P network), etc. The blockchain network can include a plurality of blockchain nodes. Unified blockchain ledgers are maintained among blockchain nodes together, with copies of the blockchain ledger stored, respectively, on each of at least some of the plurality of nodes of the blockchain network.

In the implementations, the transaction method can be executed by a remitter device. The remitter device can join the blockchain network as a blockchain node. A remitter account can be logged into on the remitter device. The remitter account can be an account of a remitter in the blockchain. The remitter account can have a signature public-private key pair, and an encryption public-private key pair. The signature public-private key pair can include a signature public key and a signature private key that are associated. The signature private key can be used to sign transaction data to be submitted to the blockchain. The signature public key can be disclosed to other blockchain nodes in the blockchain network for the other blockchain nodes to verify the signed transaction data. The encryption public-private key pair can include a homomorphic encryption public key and a homomorphic encryption private key that are associated to one another. The homomorphic encryption public key can be disclosed to other blockchain nodes in the blockchain network, so the other blockchain nodes can encrypt data, e.g., a remitter balance, a remitter random number, and a commitment random number, by using a homomorphic encryption algorithm. The homomorphic encryption private key can be used to decrypt an encrypted ciphertext. The remitter account can also register a remitter balance commitment and a remitter random number ciphertext in the blockchain.

The remitter balance commitment can be calculated by the remitter device based on the remitter random number and the remitter balance. The remitter random number can be a random number corresponding to the remitter account and used for constructing the remitter balance commitment. The remitter balance can be a balance of any type of resource. The resource can include, for example, securities, coupons, property, virtual currency, and funds. Specifically, the remitter balance commitment can be implemented based on any type of commitment scheme with homomorphism, such as a Pedersen commitment mechanism. Taking the Pedersen commitment mechanism as an example, the remitter balance commitment can be calculated based on equation $PC(r\_A, s\_A) = g^{r\_A} h^{s\_A}$, where, $PC(r\_A, s\_A)$ is the remitter balance commitment; $r\_A$ is the remitter random number; $s\_A$ is the remitter balance; g and h are pre-determined parameters, respectively. Certainly, the remitter balance commitment can also be implemented by using a homomorphic encryption algorithm. That is, a ciphertext obtained by encrypting the remitter balance based on the homomorphic encryption algorithm is used as the remitter balance commitment. The homomorphic encryption algorithm will be described in detail subsequently. As such, on the one hand, direct registration of the remitter balance can be avoided by registering the remitter balance commitment in the blockchain, so the remitter balance can be hidden and kept secret. On the other hand, because the commitment mechanism can support a high-efficiency zero-knowledge proof, the remitter balance commitment can make a zero-knowledge proof, e.g., a third zero-knowledge proof in the subsequent process, process involving the remitter balance in the subsequent process more efficient.

The remitter random number ciphertext can be obtained by encrypting the remitter random number based on the remitter balance by using the homomorphic encryption algorithm. Specifically, the remitter device can obtain the remitter random number ciphertext by encrypting the remitter random number based on the homomorphic encryption public key of the remitter account and the remitter balance using the homomorphic encryption algorithm. The homomorphic encryption algorithm can include, for example, the Okamoto-Uchiyama algorithm and the Boneh-Goh-Nissim algorithm. Taking the Okamoto-Uchiyama algorithm as an example, the remitter random number ciphertext can be calculated based on equation $OU\_A(r\_A) = u1^{r\_A} v1^{s\_A}$, where $OU\_A(r\_A)$ is the remitter random number ciphertext; $r\_A$ is the remitter random number; each of u1 and v1 is a portion of the homomorphic encryption public key of the remitter account; $s\_A$ is the remitter balance. In the implementations, the remitter random number can be used as an encrypted plaintext, and the remitter balance can be used as a random number for homomorphic encryption, thereby enabling encryption of the remitter random number. On the one hand, the burden caused by locally keeping the remitter random number off the chain can be avoided by registering the remitter random number in the blockchain. On the other hand, direct registration of the remitter random number can be avoided by registering the remitter random number ciphertext in the blockchain, so the remitter random number can be hidden and kept secret.

It should be noted that, when it is necessary to obtain the remitter balance, the remitter device can obtain the remitter random number by decrypting the remitter random number ciphertext using a homomorphic encryption private key of the remitter account; and can calculate the remitter balance based on the remitter random number and the remitter balance commitment. The remitter device can calculate the remitter balance by using, for example, the Kangaroo method in the Pollard algorithm. Certainly, the Kangaroo method listed herein is merely an example, and in practice the remitter device can calculate the remitter balance in other ways. For example, the remitter random number ciphertext can be $OU\_A(r\_A)=u1^{r\_A}v1^{s\_A}$, and the remitter balance commitment can be $PC(r\_A,s\_A)=g^{r\_A}h^{s\_A}$. Then, the remitter device can obtain the remitter random number $r\_A$ by decrypting the remitter random number ciphertext $OU\_A(r\_A)$ using the homomorphic encryption private key of the remitter account; calculate $h^{s\_A}$ based on the remitter random number $r\_A$ and the remitter balance commitment $PC(r\_A,s\_A)$; and calculate the remitter balance $s\_A$ based on $h^{s\_A}$ by using the Kangaroo method in the Pollard algorithm. In addition, when the remitter balance commitment is implemented by using the homomorphic encryption algorithm, the remitter device can obtain the remitter balance by decrypting the remitter balance commitment using the homomorphic encryption private key of the remitter account. Specifically, for example, the remitter balance commitment implemented by using the Okamoto-Uchiyama algorithm can be $PC(r\_A,s\_A)=u1^{s\_A}v1^{r\_A}$.

In the implementations, the transaction method can transfer the transaction amount from the remitter account to a remittee account. The remittee account can be an account of a remittee in the blockchain. The remittee account can be logged into on a remittee device. The remittee device can join the blockchain network as a blockchain node. The transaction amount can be negotiated between the remitter and the remittee. Similar to the remitter account, the remittee account can have a signature public-private key pair, and an encryption public-private key pair. The remittee account can also register a remittee balance commitment and a remittee random number ciphertext in the blockchain. The remittee balance commitment can be calculated by the remittee device based on the remittee random number and the remittee balance. The remittee random number ciphertext can be obtained by encrypting the remittee random number based on the remittee balance by using the homomorphic encryption algorithm.

The transaction method can include the following steps. It should be noted that although the present specification provides the method operation steps in the implementations or the flowcharts, more or fewer operation steps can be included based on conventional or non-creative efforts. In addition, a sequence of the steps listed in the implementation is merely one of numerous execution sequences of the steps, and does not represent a unique execution sequence. In actual execution of an apparatus or a product, execution can be performed based on the method sequence shown in the implementation or the accompanying drawing, or performed in parallel, e.g., a parallel processor or a multi-thread processing environment.

Step S10: Calculate a transaction amount commitment based on a commitment random number and a transaction amount.

In the implementations, the commitment random number can be generated by the remitter device. The transaction amount can be negotiated between the remitter and the remittee. The transaction amount commitment can be implemented based on any type of commitment scheme with homomorphism, such as a Pedersen commitment mechanism. Taking the Pedersen commitment mechanism as an example, the transaction amount commitment can be calculated based on equation $PC(r,t)=g^r h^t$, where, $PC(r,t)$ is the transaction amount commitment; $r$ is the commitment random number; $t$ is the transaction amount; $g$ and $h$ are pre-determined parameters, respectively. As such, the transaction amount can be hidden and kept secret by using the transaction amount commitment.

Step S12: Obtain a first commitment random number ciphertext by encrypting the commitment random number based on a homomorphic encryption public key of a remitter account and the transaction amount using a homomorphic encryption algorithm.

In the implementations, the homomorphic encryption algorithm can include, for example, the Okamoto-Uchiyama algorithm and the Boneh-Goh-Nissim algorithm. Taking the Okamoto-Uchiyama algorithm as an example, the first commitment random number ciphertext can be calculated based on equation $OU\_A(r)=u1^r v1^t$, where $OU\_A(r)$ is the first commitment random number ciphertext; $r$ is the commitment random number; each of $u1$ and $v1$ is a portion of the homomorphic cryptographic public key of the remitter account, respectively; $t$ is the transaction amount. In the implementations, the commitment random number can be used as an encrypted plaintext, and the transaction amount can be used as a random number for homomorphic encryption, thereby enabling encryption of the commitment random number.

Step S14: Obtain a second commitment random number ciphertext by encrypting the commitment random number based on a homomorphic encryption public key of a remittee account and the transaction amount using the homomorphic encryption algorithm.

In the implementations, the homomorphic encryption algorithm can include, for example, the Okamoto-Uchiyama algorithm and the Boneh-Goh-Nissim algorithm. Taking the Okamoto-Uchiyama algorithm as an example, the second commitment random number ciphertext can be calculated based on equation $OU\_B(r)=u2^r v2^t$, where $OU\_B(r)$ is the second commitment random number ciphertext; $r$ is the commitment random number; each of $u2$ and $v2$ is a portion of the homomorphic cryptographic public key of the remittee account, respectively; $t$ is the transaction amount. In the implementations, the commitment random number can be used as an encrypted plaintext, and the transaction amount can be used as a random number for homomorphic encryption, thereby enabling encryption of the commitment random number.

Step S16: Submit transaction data to the blockchain.

In the implementations, the transaction data can include the transaction amount commitment, the first commitment random number ciphertext, and the second commitment random number ciphertext. The remitter device can submit the transaction data to the blockchain, for the transaction amount commitment and the first commitment random number ciphertext to be recorded into the remitter account, and the transaction amount commitment and the second commitment random number ciphertext to be recorded into the remittee account.

Specifically, after the transaction data is submitted to the blockchain, a consensus blockchain node in the blockchain network can update the remitter balance commitment based on the transaction amount commitment; update the remitter random number ciphertext based on the first commitment random number ciphertext; update the remittee balance commitment based on the transaction amount commitment; and update the remittee random number ciphertext based on the second commitment random number ciphertext. The consensus blockchain node can be a blockchain node determined based on a consensus mechanism of the blockchain network. As such, the transaction data can be recorded into a blockchain ledger maintained by each blockchain node in the blockchain network, so as to avoid tampering.

An updated remitter balance commitment can be a quotient of the remitter balance commitment and the transaction amount commitment. Because the remitter balance commitment and the transaction amount commitment are implemented by using a homomorphic commitment mechanism, the transaction amount can be deducted from the remitter balance and the commitment random number can be deducted from the remitter random number. For example, the remitter balance commitment can be $PC(r\_A, s\_A) = g^{r\_A} h^{s\_A}$; the transaction amount commitment can be $PC(r, t) = g^r h^t$; the updated remitter balance commitment can be $PC(r\_A-r, s\_A-t) = PC(r\_A, s\_A)/PC(r,t) = g^{(r\_A-r)} h^{(s\_A-t)}$.

An updated remitter random number ciphertext can be a quotient of the remitter random number ciphertext and the first commitment random number ciphertext. Because the remitter random number ciphertext and the first commitment random number ciphertext are calculated by using the homomorphic encryption algorithm, the transaction amount can be deducted from the remitter balance, and the commitment random number can be deducted from the remitter random number. For example, the remitter random number ciphertext can be $OU\_A(r\_A) = u1^{r\_A} v1^{s\_A}$; the first commitment random number ciphertext can be $OU\_A(r) = u1^r v1^t$; the updated remitter random number ciphertext can be $OU\_A(r\_A-r) = OU\_A(r\_A) OU\_A(r) = u1^{r\_A-r} v1^{s\_A-t}$.

An updated remittee balance commitment can be a product of the remittee balance commitment and the transaction amount commitment. Because the remittee balance commitment and the transaction amount commitment are implemented by using the homomorphic commitment mechanism, the transaction amount can be added to the remittee balance and the commitment random number can be added to the remittee random number. For example, the remittee balance commitment can be $PC(r\_B, s\_B) = g^{r\_B} h^{s\_B}$; the transaction amount commitment can be $PC(r,t) = g^r h^t$; the updated remittee balance commitment can be $PC(r\_B+r, s\_B+t) = PC(r\_B, s\_B) PC(r,t) = g^{(r\_B+r)} h^{(s\_B+t)}$, $r\_B$ is the remittee random number; $s\_B$ is the remittee balance; g and h are predetermined parameters, respectively.

An updated remittee random number ciphertext can be a product of the remittee random number ciphertext and the second commitment random number ciphertext. Because the remittee random number ciphertext and the second commitment random number ciphertext are calculated by using the homomorphic encryption algorithm, the transaction amount can be added to the remittee balance, and the commitment random number can be added to the remittee random number. For example, the remittee random number ciphertext can be $OU\_B(r\_B) r\_B = u2^{r\_B} v2^{s\_B}$; the second commitment random number ciphertext can be $OU\_B(r) = u2^r v2^t$; the updated remittee random number ciphertext can be $OU\_B(r\_B+r) = OU\_B(r\_B) OU\_B(r) = u2^{r\_B+r} v2^{s\_B+t}$.

In an implementation, the remitter device can further generate a first zero-knowledge proof based on a zero-knowledge proof technique; and add the first zero-knowledge proof to the transaction data for the consensus blockchain node to verify that the transaction amount is not less than 0. The zero-knowledge proof technique can be implemented, for example, based on the zero-knowledge succinct non-interactive argument of knowledge "zkSNARK" scheme. Further, the zero-knowledge proof technique can include a range proof technique. The remitter device can generate a first range proof based on the range proof technique; and add the first range proof to the transaction data for the consensus blockchain node to verify that the transaction amount is not less than 0. The range proof technique can be implemented, for example, based on the Bulletproofs scheme or the Borromean ring signature scheme.

In an implementation, the remitter device can further generate a second zero-knowledge proof based on the zero-knowledge proof technique; and add the second zero-knowledge proof to the transaction data for the consensus blockchain node to verify that the transaction amount is not greater than the remitter balance. Further, the zero-knowledge proof technique can include the range proof technique. The remitter device can generate a second range proof based on the range proof technique; and add the second range proof to the transaction data for the consensus blockchain node to verify that the transaction amount is not greater than the remitter balance.

In an implementation, the remitter device can further generate a third zero-knowledge proof based on the zero-knowledge proof technique; and add the third zero-knowledge proof to the transaction data for the consensus blockchain node to verify that the commitment random number for calculating the transaction amount commitment, the commitment random number for calculating the first commitment random number ciphertext, and the commitment random number for calculating the second commitment random number ciphertext are consistent with one another, and verify that the transaction amount for calculating the transaction amount commitment, the transaction amount for calculating the first commitment random number ciphertext, and the transaction amount for calculating the second commitment random number ciphertext are consistent with one another.

For example, the third zero-knowledge proof can be (C, D, E, a, b). $C = g^{r^*} h^{t^*}$; $D = u1^{r^*} v1^{t^*}$; $E = u2^{r^*} v2^{t^*}$; $x = \text{Hash}(C, D, E)$; $a = r^* + xr$; $b = t^* + xt$. $r^*$ and $t^*$ are random numbers generated by the remitter device and respectively correspond to the commitment random number r and the transaction amount t; Hash represents a hash operation.

When verifying that all $g^a h^b = CT^x$, $u1^a v1^b = DM^x$, and $u2^a v2^b = EN^x$ are valid, the consensus blockchain node considers that the commitment random number for calculating the transaction amount commitment, the commitment random number for calculating the first commitment random number ciphertext, and the commitment random number for calculating the second commitment random number ciphertext are consistent with one another, and considers that the transaction amount for calculating the transaction amount commitment, the transaction amount for calculating the first commitment random number ciphertext, and the transaction amount for calculating the second commitment random number ciphertext are consistent with one another. T is the transaction amount commitment $PC(r,t)$; M is the first commitment random number ciphertext $OU\_A(r)$; N is the second commitment random number ciphertext $OU\_B(r)$.

In an implementation, the remitter device can calculate the first transaction amount commitment based on the first commitment random number and a first transaction amount; and calculate the second transaction amount commitment based on the second commitment random number and a second transaction amount. The first commitment random number and the second commitment random number can be generated by the remitter device. The first transaction amount can be a transaction amount to be transferred out of the remitter account. The second transaction amount can be a transaction amount to be transferred to the remittee account. As such, the transaction amount to be transferred out of the remitter account and the transaction amount to be transferred to the remittee account can be distinguished.

The remitter device can obtain the first commitment random number ciphertext by encrypting the first commitment random number based on the homomorphic encryption public key of the remitter account and the first transaction amount using the homomorphic encryption algorithm; obtain the second commitment random number ciphertext by encrypting the second commitment random number based on the homomorphic encryption public key of the remittee account and the second transaction amount using the homomorphic encryption algorithm; and submit the transaction data to the blockchain. The transaction data can include the first transaction amount commitment, the second transaction amount commitment, the first commitment random number ciphertext, and the second commitment random number ciphertext, for the first transaction amount commitment and the first commitment random number ciphertext to be recorded into the remitter account, and the second transaction amount commitment and the second commitment random number ciphertext to be recorded into the remittee account.

Specifically, after the transaction data is submitted to the blockchain, the consensus blockchain node can update the remitter balance commitment based on the first transaction amount commitment; update the remitter random number ciphertext based on the first commitment random number ciphertext; update the remittee balance commitment based on the second transaction amount commitment; and update the remittee random number ciphertext based on the second commitment random number ciphertext.

An updated remitter balance commitment can be a quotient of the remitter balance commitment and the first transaction amount commitment; an updated remitter random number ciphertext can be a quotient of the remitter random number ciphertext and the first commitment random number ciphertext; an updated remittee balance commitment can be a product of the remittee balance commitment and the second transaction amount commitment; and an updated remittee random number ciphertext can be a product of the remittee random number ciphertext and the second commitment random number ciphertext.

Further, the remitter device can further generate a fourth zero-knowledge proof based on the zero-knowledge proof technique; and add the fourth zero-knowledge proof to the transaction data for the consensus blockchain node to verify that the first transaction amount for calculating the first transaction amount commitment and the second transaction amount for calculating the second transaction amount commitment are consistent with one another, so as to prevent the transaction amount transferred out of the remitter account from being inconsistent with the transaction amount transferred to the remittee account.

In an implementation, the remitter device can further obtain signature data by signing the transaction data using a signature private key of the remitter account; and add the signature data to the transaction data for the consensus blockchain node to perform signature verification.

In the implementations, the transaction amount commitment, the first commitment random number ciphertext, and the second commitment random number ciphertext can be obtained by using the commitment mechanism and the homomorphic encryption mechanism. The transaction amount commitment, the first commitment random number ciphertext, and the second commitment random number ciphertext can be submitted to the blockchain, for the transaction amount commitment and the first commitment random number ciphertext to be recorded into the remitter account, and the transaction amount commitment and the second commitment random number ciphertext to be recorded into the remittee account. On the one hand, privacy protection can be realized for transaction information such as the transaction amount by using the commitment mechanism and the homomorphic encryption mechanism. On the other hand, the transaction can be smoothly completed in the blockchain without the remittee device by submitting the transaction amount commitment, the first commitment random number ciphertext, and the second commitment random number ciphertext to the blockchain. Therefore, the implementation can realize privacy protection under a non-interactive condition.

Further, the remitter account can register the remitter balance commitment and the remitter random number ciphertext in the blockchain. The remittee account can register the remittee balance commitment and the remittee random number ciphertext in the blockchain. On the one hand, privacy protection can be realized for both the account balance and the transaction amount. On the other hand, by registering the remitter random number ciphertext and the remittee random number ciphertext on the blockchain, the burden caused by locally keeping the remitter random number and the remittee random number off the chain can be avoided, and the risk of loss can be avoided.

Figure 3:
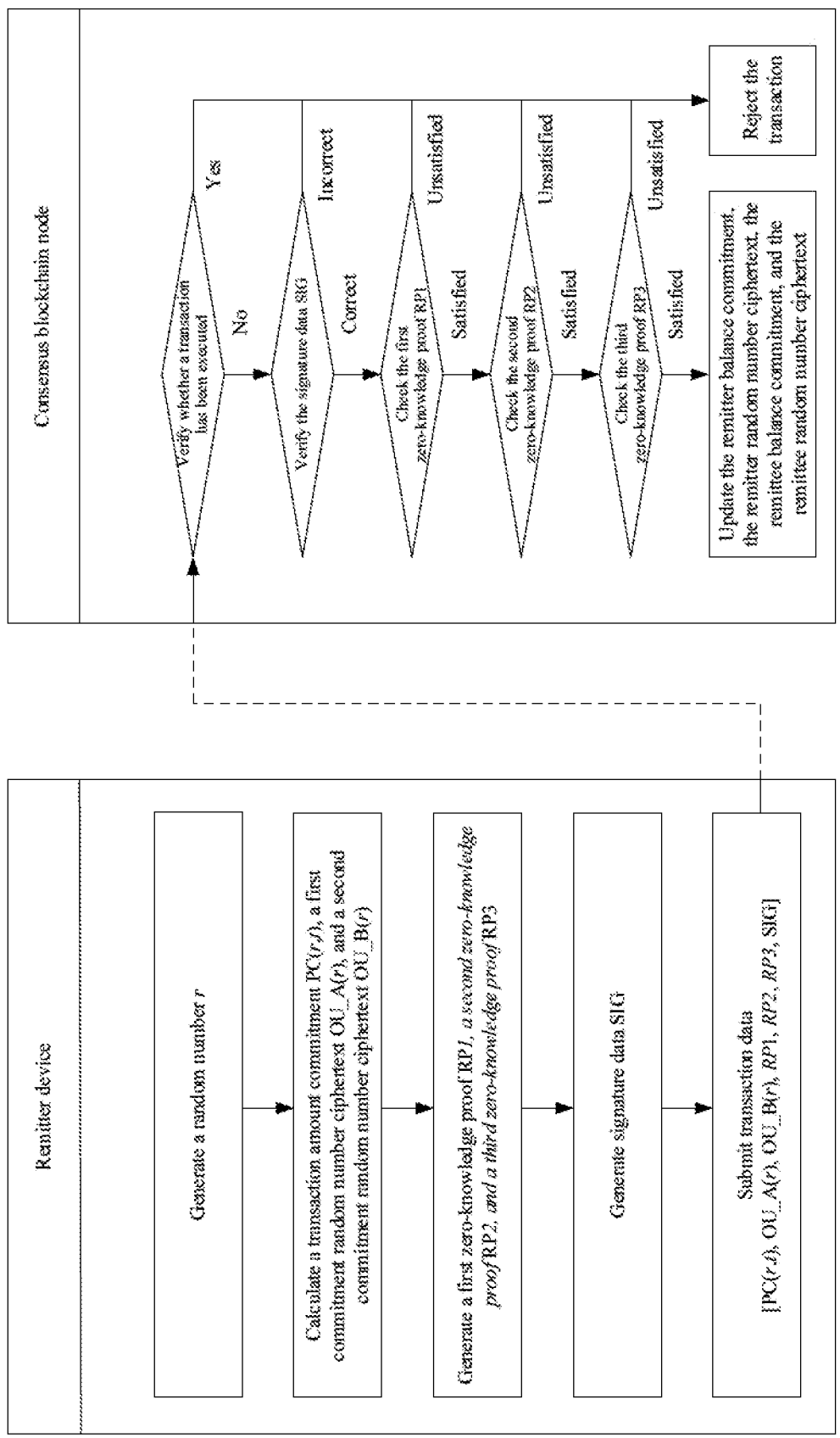
FIG. 3 is a flowchart illustrating blockchain-based transaction implementation according to an implementation of the present specification.

Refer to FIG. 1, FIG. 2 and FIG. 3. For ease of understanding, an example scenario of an implementation of the present specification is described below.

In this implementation, assume that the remitter account can be Account_A. The remitter account Account_A can have a signature public-private key pair and an encryption public-private key pair. The remitter account Account_A can also register a remitter balance commitment $PC(r\_A,s\_A)=g^{r\_A}h^{s\_A}$ and a remitter random number ciphertext $OU\_A(r\_A)=u1^{r\_A}v1^{s\_A}$. $r\_A$ is the remitter random number; $s\_A$ is the remitter balance; g and h are pre-determined parameters; each of u1 and v1 is a portion of the homomorphic encryption public key of the remitter account.

Assume that the remittee account can be Account_B. The remittee account Account_B can have a signature public-private key pair and an encryption public-private key pair. The remittee account Account_B can also register a remittee balance commitment $PC(r\_B,s\_B)=g^{r\_B}h^{s\_B}$ and a remittee random number ciphertext $OU\_B(r\_B)=u2^{r\_B}v2^{s\_B}$. $r\_B$ is the remittee random number; $s\_B$ is the remittee balance; g and h are pre-determined parameters; each of u2 and v2 is a portion of the homomorphic encryption public key of the remittee account.

In the implementations, the example transaction of the scenario can implement the transfer of transaction amount t from the remitter account Account_A to the remittee account Account_B. Specifically, for example, the remitter device can generate the commitment random number r; calculate the transaction amount commitment $PC(r,t)=g^r h^t$ based on the commitment random number r and transaction amount t; obtain the first commitment random number ciphertext $OU\_A(r)=u1^r v1^t$ by encrypting the commitment random number r based on the homomorphic encryption public key of the remitter account and transaction amount t using the homomorphic encryption algorithm; obtain the second commitment random number ciphertext $OU\_B(r)=u2^r v2^t$ by encrypting the commitment random number r based on the homomorphic encryption public key of the remittee account and transaction amount t using the homomorphic encryption algorithm.

In this implementation, the remitter device can generate a first zero-knowledge proof RP1, a second zero-knowledge proof RP2, and a third zero-knowledge proof RP3. The first zero-knowledge proof RP1 can be used to verify that $t \geq 0$. The second zero-knowledge proof RP2 can be used to verify that $s\_A-t \geq 0$. The third zero-knowledge proof RP3 can be used to verify that the commitment random number r in $PC(r,t)=g^r h^t$, the commitment random number r in $OU\_A(r)=u1^r v1^t$, and the commitment random number r in $OU\_B(r)=u2^r v2^t$ are consistent with one another, and verify that transaction amount t in $PC(r,t)=g^r h^t$, transaction amount $OU\_A(r)=u1^r v1^t$, and transaction amount t in $OU\_B(r)=u2^r v2^t$ are consistent with one another.

In this implementation, the remitter device can obtain signature data SIG by signing [PC(r,t), OU_A(r), OU_B(r), RP1, RP2, RP3] using a signature private key of the remitter account; and submit transaction data [PC (r,t), OU_A(r), OU_B(r), RP1, RP2, RP3, SIG] to the blockchain.

In this implementation, the blockchain network can determine a consensus blockchain node based on the consensus mechanism. By using the anti-double-spending or anti-replay mechanism of the related technologies, the consensus blockchain node can verify whether the transaction has been executed. If the transaction has been executed, the consensus blockchain node can reject the transaction.

If the transaction has not been executed, the consensus blockchain node can verify whether the signature data SIG in the transaction data is correct. If the signature data SIG is incorrect, the consensus blockchain node can reject the transaction.

If the signature data SIG is correct, the consensus blockchain node can check the first zero-knowledge proof RP1 in the transaction data to verify whether $t \geq 0$ is satisfied. If not satisfied, the consensus blockchain node can reject the transaction.

If satisfied, the consensus blockchain node can check the second zero-knowledge proof RP2 in the transaction data to verify whether $s\_A-t \geq 0$ is satisfied. If not satisfied, the consensus blockchain node can reject the transaction.

If satisfied, the consensus blockchain node can check the third zero-knowledge proof RP3 in the transaction data to verify whether the commitment random number r in $PC(r,t)=g^r h^t$, the commitment random number r in $OU\_A(r)=u1^r v1^t$, and the commitment random number r in $OU\_B(r)=u2^r v2^t$ are consistent with one another, and verify whether transaction amount t in $PC(r,t)=g^r h^t$, transaction amount t in $OU\_A(r)=u1^r v1^t$, and transaction amount t in $OU\_B(r)=u2^r v2^t$ are consistent with one another. If not satisfied, the consensus blockchain node can reject the transaction.

If satisfied, the consensus blockchain node can update the remitter balance commitment PC(r_A,s_A), the remitter random number ciphertext OU_A(r_A), the remitee balance commitment PC(r_B,s_B), and the remitee random number ciphertext OU_B(r_B). Specifically, the updated remitter balance commitment can be $PC(r\_A-r,s\_A-t)=PC(r\_A,s\_A)/PC(r,t)=g^{(r\_A-r)}h^{(s\_A-t)}$; the updated remitter random number ciphertext can be $OU\_A(r\_A)-r)=OU\_A(r\_A)/OU\_A(r)=u1^{r\_A-r}v1^{s\_A-t}$; an updated remitee balance commitment can be $PC(r\_B+r,s\_B+t)=PC(r\_B,s\_B)PC(r,t)=g^{(r\_B+r)}h^{(s\_B+t)}$; an updated remitee random number ciphertext can be $OU\_B(r\_B+r)=OU\_B(r\_B)OU\_B(r)=u2^{r\_B+r}v2^{s\_B+t}$.

Figure 4:
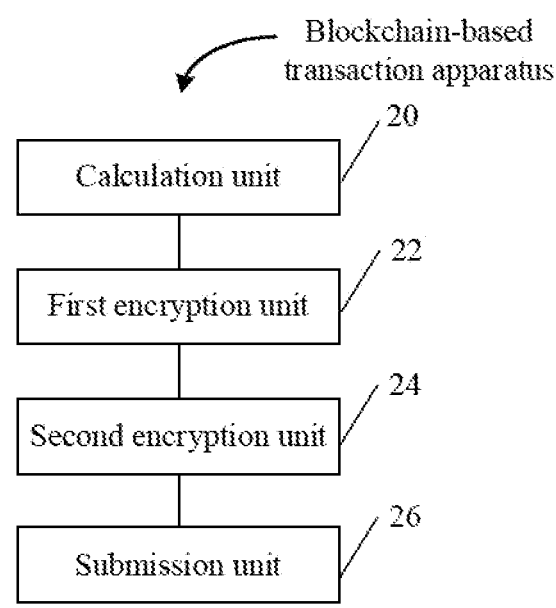
FIG. 4 is a function structural diagram illustrating a blockchain-based transaction apparatus according to an implementation of the present specification.

Referring to FIG. 4, an implementation of the present specification further provides a blockchain-based transaction apparatus. The transaction apparatus can include the following units: a calculation unit 20, configured to calculate a transaction amount commitment based on a commitment random number and a transaction amount; a first encryption unit 22, configured to obtain a first commitment random number ciphertext by encrypting the commitment random number based on a homomorphic encryption public key of a remitter account and the transaction amount using a homomorphic encryption algorithm; a second encryption unit 24, configured to obtain a second commitment random number ciphertext by encrypting the commitment random number based on a homomorphic encryption public key of a remitee account and the transaction amount using the homomorphic encryption algorithm; and a submission unit 26, configured to submit transaction data to the blockchain, the transaction data including the transaction amount commitment, the first commitment random number ciphertext, and the second commitment random number ciphertext, for the transaction amount commitment and the first commitment random number ciphertext to be recorded into the remitter account, and the transaction amount commitment and the second commitment random number ciphertext to be recorded into the remitee account.

Figure 5:
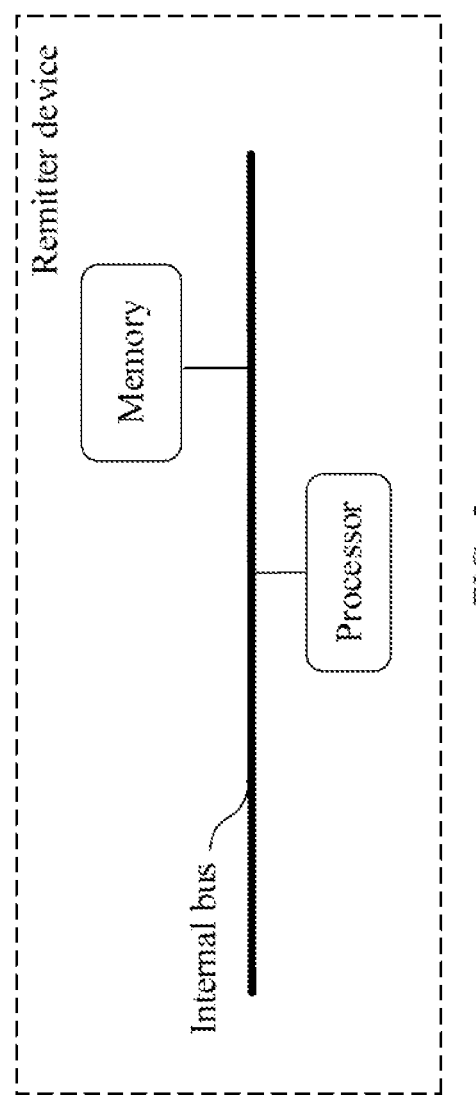
FIG. 5 is a function structural diagram illustrating a remitter device according to an implementation of the present specification.

Referring to FIG. 5, an implementation of the present specification further provides a remitter device. The remitter device can include a memory and a processor.

In this implementation, the memory can be implemented in any suitable way. For example, the memory can be a read-only memory, a mechanical hard disk, a solid-state drive, a USB flash drive, etc. The memory can be configured to store computer instructions.

In this implementation, the processor can be implemented in any suitable way. For example, the processor can be a microprocessor, a processor, or a computer readable medium storing computer readable program code (such as software or firmware) that can be executed by the microprocessor or the processor, a logic gate, a switch, an application-specific integrated circuit (ASIC), a programmable logic controller, or a built-in microcontroller. The processor can execute the computer instructions to perform the steps of: calculating a transaction amount commitment based on a commitment random number and a transaction amount; obtaining a first commitment random number ciphertext by encrypting the commitment random number based on a homomorphic encryption public key of a remitter account and the transaction amount using a homomorphic encryption algorithm; obtaining a second commitment random number ciphertext by encrypting the commitment random number based on a homomorphic encryption public key of a remitee account and the transaction amount using the homomorphic encryption algorithm; and submitting transaction data to the blockchain, the transaction data including the transaction amount commitment, the first commitment random number ciphertext, and the second commitment random number ciphertext, for the transaction amount commitment and the first commitment random number ciphertext to be recorded into the remitter account, and the transaction amount commitment and the second commitment random number ciphertext to be recorded into the remitee account.

The implementations in the present specification are described in a progressive method. For the same or similar parts in the implementations, references can be made to each other. Each implementation focuses on a difference from other implementations. Especially, an apparatus implementation and a device implementation are basically similar to a method implementation, and therefore are described briefly. For related parts, refer to descriptions in the method implementation.

After reading the present specification, a person skilled in the art can think of any combination between some or all of the implementations enumerated in the present specification without creative efforts. These combinations are also within the scope disclosed and protected by the present specification.

In the 1990s, whether technology improvement is hardware improvement (for example, improvement of a circuit structure, such as a diode, a transistor, or a switch) or software improvement (improvement of a method procedure) can be clearly distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. A designer performs programming to "integrate" a digital system to a single PLD, without requiring a chip manufacturer to design and manufacture a dedicated integrated circuit chip 2. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

The system, apparatus, module, or unit illustrated in the implementations can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

It can be understood from the descriptions of the implementations that a person skilled in the art can clearly understand that the present specification can be implemented by using software and a necessary general hardware platform. Based on such an understanding, the technical solutions in the present specification essentially or the part contributing to the existing technology can be implemented in a form of a software product. The computer software product can be stored in a storage medium, such as a ROM/RAM, a magnetic disk, or an optical disc, and includes several instructions for instructing a computer device (which can be a personal computer, a server, a network device, etc.) to execute the method described in the implementations of the present specification or in some parts of the implementations of the present specification.

To provide further context for embodiments of this specification, and as introduced herein, distributed ledger systems (DLSs) (which can also be referred to as consensus networks, made up of peer-to-peer nodes), and blockchain networks, enable participating entities to securely, and immutably, conduct transactions and store data. Although the term blockchain is generally associated with particular networks, and/or use cases, blockchain is used herein to generally refer to a DLS without reference to any particular use case.

A blockchain is a data structure that stores transactions in a way that the transactions are immutable. Thus, the recording of transactions on a blockchain is reliable and trustworthy. A blockchain includes one or more blocks. Each block in the chain is linked to a previous block immediately before it in the chain by including a cryptographic hash of the previous block. Each block also includes a timestamp, its own cryptographic hash, and one or more transactions. Within a block, the transactions, which have already been verified by the nodes of the blockchain network, are hashed and encoded into a Merkle tree. The Merkle tree is a data structure in which each leaf node includes a hash on a corresponding transaction, and each non-leaf node includes a hash on the concatenation of the hashes in its children. With this process continuing up the tree to the root of the entire tree, the root node includes a hash that is representative of all data in the tree. A hash purporting to be of a transaction stored in the tree can be quickly verified by determining whether it is consistent with the structure of the tree.

Where a blockchain is a decentralized or at least partially decentralized data structure for storing transactions, a blockchain network is a network of computing nodes that manage, update, and maintain one or more blockchains by broadcasting, verifying and validating transactions, etc. As introduced above, a blockchain network can be provided as a public blockchain network, a private blockchain network, or a consortium blockchain network. Embodiments of this specification are described in further detail herein with reference to a consortium blockchain network. However, embodiments of this specification can be realized in any appropriate type of blockchain network.

In general, a consortium blockchain network is private among the participating entities. In a consortium blockchain network, the consensus process is controlled by an authorized set of nodes, referred to as consensus nodes, one or more of which are operated by a respective entity (a financial institution, insurance company, etc.). For example, a consortium of ten (10) entities (financial institutions, insurance companies, etc.) can operate a consortium blockchain network, each of which operates at least one node in the consortium blockchain network.

In some examples, within a consortium blockchain network, a global blockchain is provided as a blockchain that is replicated across all nodes. That is, all consensus nodes are typically in perfect state consensus with respect to the global blockchain. To achieve consensus (agreement to the addition of a block to a blockchain), a consensus protocol or algorithm is implemented within the consortium blockchain network. For example, the consortium blockchain network can implement a practical Byzantine fault tolerance (PBFT) consensus, described in further detail below.

Figure 6:
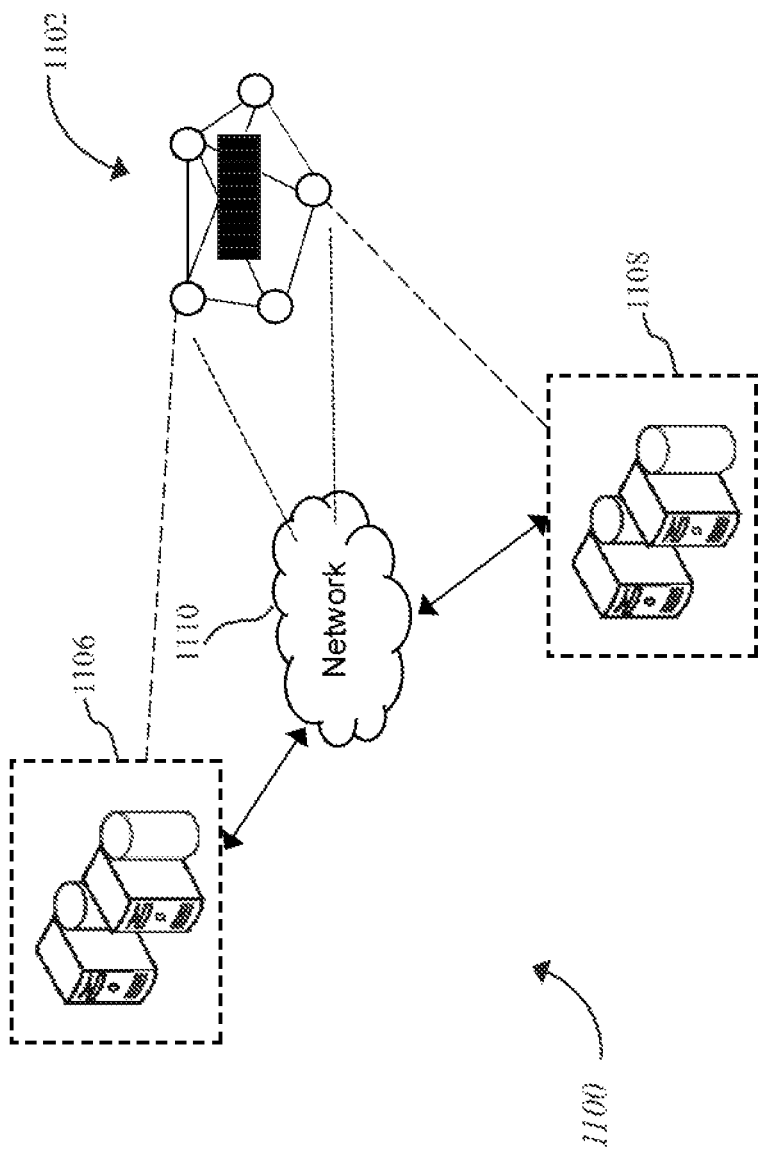
FIG. 6 is a diagram illustrating example environments that can be used to execute embodiments of this specification.

FIG. 6 is a diagram illustrating an example of an environment 1100 that can be used to execute embodiments of this specification. In some examples, the environment 1100 enables entities to participate in a consortium blockchain network 1102. The environment 1100 includes a plurality of computing devices 1106, 1108, and a network 1110. In some examples, the network 1110 includes a local area network (LAN), wide area network (WAN), the Internet, or a combination thereof, and connects web sites, user devices (computing devices), and back-end systems. In some examples, the network 1110 can be accessed over a wired and/or a wireless communications link. In some examples, the network 1110 enables communication with, and within the consortium blockchain network 1102. In general the network 1110 represents one or more communication networks. In some cases, the network 1110 includes network hardware such as switches, routers, repeaters, electrical cables and optical fibers, light emitters and receivers, radio transmitters and receivers, and the like. In some cases, the computing devices 1106, 1108 can be nodes of a cloud computing system (not shown), or each computing device 1106, 1108 can be a separate cloud computing system including a number of computers interconnected by a network and functioning as a distributed processing system.

In the depicted example, the computing systems 1106, 1108 can each include any appropriate computing system that enables participation as a node in the consortium blockchain network 1102. Examples of computing devices include, without limitation, a server, a desktop computer, a laptop computer, a tablet computing device, and a smartphone. In some examples, the computing systems 1106, 1108 host one or more computer-implemented services for interacting with the consortium blockchain network 1102. For example, the computing system 1106 can host computer-implemented services of a first entity (user A), such as a transaction management system that the first entity uses to manage its transactions with one or more other entities (other users). The computing system 1108 can host computer-implemented services of a second entity (user B), such as a transaction management system that the second entity uses to manage its transactions with one or more other entities (other users). In the example of FIG. 6, the consortium blockchain network 1102 is represented as a peer-to-peer network of nodes, and the computing systems 1106, 1108 provide nodes of the first entity and second entity, respectively, which participate in the consortium blockchain network 1102.

Figure 7:
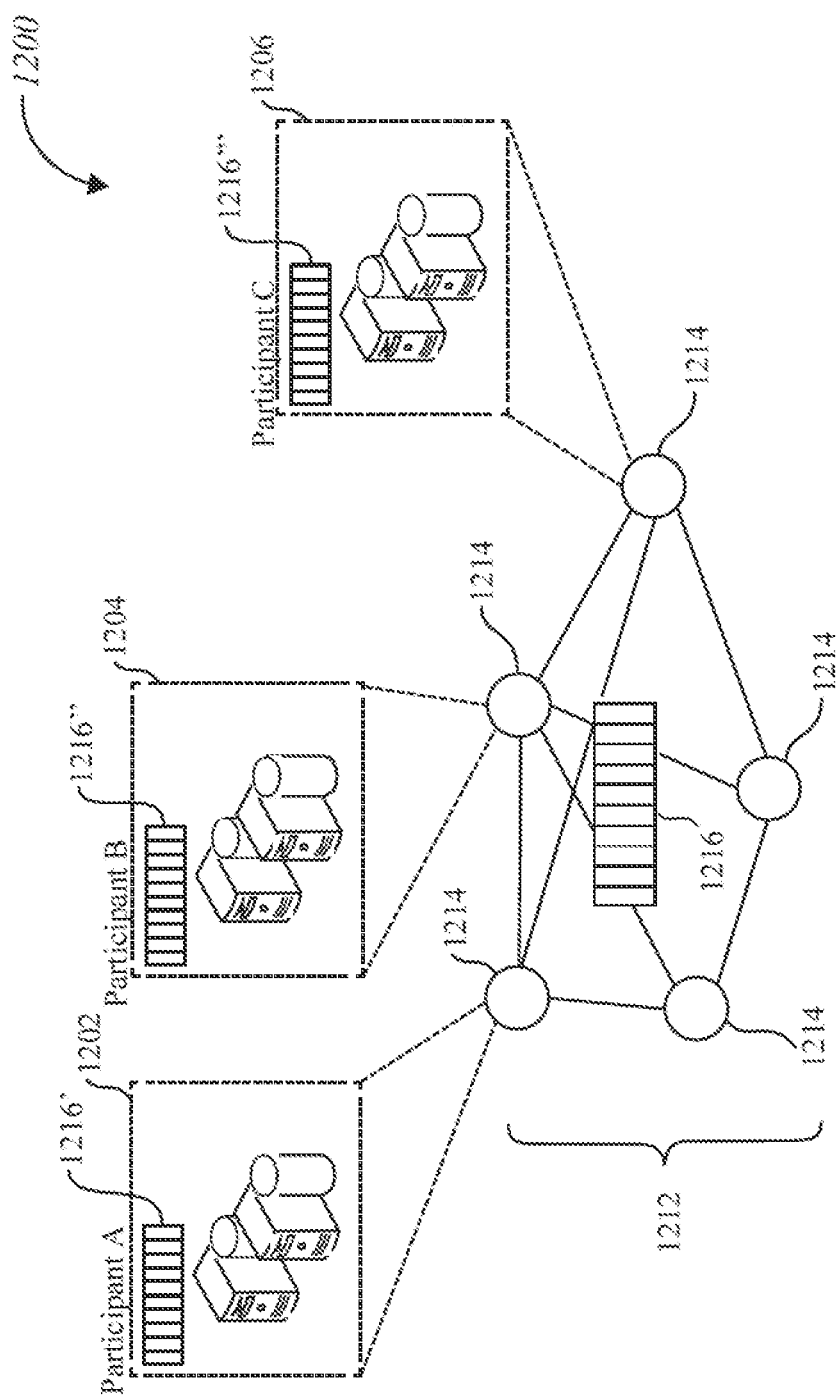
FIG. 7 is a diagram illustrating an example architecture in accordance with embodiments of this specification.

FIG. 7 depicts an example architecture 1200 in accordance with embodiments of this specification. The example architecture 1200 includes participant systems 1202, 1204, 1206 that correspond to Participant A, Participant B, and Participant C, respectively. Each participant (user, enterprise, etc.) participates in a blockchain network 1212 provided as a peer-to-peer network including a plurality of nodes 1214, at least some of which immutably record information in a blockchain 1216. Although a single blockchain 1216 is schematically depicted within the blockchain network 1212, multiple copies of the blockchain 1216 are provided, and are maintained across the blockchain network 1212, as described in further detail herein.

In the depicted example, each participant system 1202, 1204, 1206 is provided by, or on behalf of, Participant A, Participant B, and Participant C, respectively, and functions as a respective node 1214 within the blockchain network 1212. As used herein, a node generally refers to an individual system (computer, server, etc.) that is connected to the blockchain network 1212, and enables a respective participant to participate in the blockchain network. In the example of FIG. 7, a participant corresponds to each node 1214. It is contemplated, however, that a participant can operate multiple nodes 1214 within the blockchain network 1212, and/or multiple participants can share a node 1214. In some examples, the participant systems 1202, 1204, 1206 communicate with, or through, the blockchain network 1212 using a protocol (hypertext transfer protocol secure (HTTPS)), and/or using remote procedure calls (RPCs).

Nodes 1214 can have varying degrees of participation within the blockchain network 1212. For example, some nodes 1214 can participate in the consensus process (as miner nodes that add blocks to the blockchain 1216), while other nodes 1214 do not participate in the consensus process. As another example, some nodes 1214 store a complete copy of the blockchain 1216, while other nodes 1214 only store copies of portions of the blockchain 1216. For example, data access privileges can limit the blockchain data that a respective participant stores within its respective system. In the example of FIG. 2, the participant systems 1202, 1204 store respective, complete copies 1216', 1216'', 1216''' of the blockchain 1216. In the descriptions herein, nodes 1214 of the blockchain network 1212 are also referred to as "participant user" for descriptive purposes. In some embodiments, some or all of the participant users 1214 participate in the consensus process and are referred to as "consensus nodes". The consensus nodes for the blockchain 1216 may also include other nodes not selected from the participant users 1214. In some other embodiments, consensus nodes for adding blocks to the blockchain 1216 do not overlap with the participant users 1214 that propose blocks to be added to the blockchain 1216.

A blockchain, such as the blockchain 1216 of FIG. 7, is made up of a chain of blocks, each block storing data. Examples of data include transaction data representative of a transaction between two or more participants. While transactions are used herein by way of non-limiting example, any appropriate data can be stored in a blockchain (documents, images, video, audio, etc.). Examples of a transaction can include, without limitation, exchanges of something of value (assets, products, services, currency, etc.) or occurrence of some events or activities. The transaction data is immutably stored within the blockchain. That is, an undetectable change cannot be made to the transaction data.

Before being stored in a block, the transaction data is hashed. Hashing is a process of transforming the transaction data, typically provided as string data, into a fixed-length hash value, typically provided as string data. It is not possible to un-hash the hash value to obtain the transaction data. Hashing ensures that even a slight change in the transaction data results in a completely different hash value. Further, and as noted above, the hash value is of a fixed length. That is, no matter the size of the transaction data the length of the hash value is fixed. Hashing includes processing the transaction data through a hash function to generate the hash value. An example of a hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and perform work to have a block added to the blockchain. Such nodes are referred to as consensus nodes. PBFT, introduced above, is used as a non-limiting example of a consensus protocol. The consensus nodes execute the consensus protocol to add transactions to the blockchain, and update the overall state of the blockchain network.

In further detail, for example, the consensus node generates a block header, hashes all of the transactions in the block, and combines the hash value in pairs to generate further hash values until a single hash value is provided for all transactions in the block (the Merkle root hash). This Merkle root hash is added to the block header. The consensus node also determines the hash value of the most recent block in the blockchain (the last block added to the blockchain) and adds the hash value of the most recent block into the block header. The consensus node also adds a nonce value, and a timestamp to the block header. The block header is hashed, which becomes the hash value of the block.

In general, PBFT provides a practical Byzantine state machine replication that tolerates Byzantine faults (malfunctioning nodes, malicious nodes, etc.). This is achieved in PBFT by assuming that faults will occur (assuming the existence of independent node failures, and/or manipulated messages sent by consensus nodes). In PBFT, the consensus nodes are provided in a sequence that includes a primary consensus node and backup consensus nodes. The primary consensus node is periodically changed. Transactions are added to the blockchain by all consensus nodes within the blockchain network reaching an agreement as to the world state of the blockchain network. In this process, messages are transmitted between consensus nodes, and each consensus nodes proves that a message is received from a specified peer node and verifies that the message was not modified during transmission.

In PBFT, the consensus protocol is provided in multiple phases with all consensus nodes beginning in the same state. To begin, a client sends a request to the primary consensus node to invoke a service operation (execute a transaction within the blockchain network). In response to receiving the request, the primary consensus node multicasts the request to the backup consensus nodes. The backup consensus nodes execute the request, and each sends a reply to the client. The client waits until a threshold number of replies are received. In some examples, the client waits for f+1 replies to be received, where f is the maximum number of faulty consensus nodes that can be tolerated within the blockchain network. The final result is that a sufficient number of consensus nodes come to an agreement on the order of the record that is to be added to the blockchain, and the record is either accepted, or rejected.

A consensus algorithm refers to a specific mechanism or terms, based on which a transaction or a block is verified and validated to be added into a blockchain. To that extent, a consensus algorithm is viewed as a specific implementation agreement adapted to follow rules of a consensus protocol. Different consensus algorithms may be created for different blockchain networks 1212 or different blockchains 1216, which all comply with a same consensus protocol.

In some blockchain networks, cryptography is implemented to maintain privacy of transactions. For example, if two nodes want to keep a transaction private, such that other nodes in the blockchain network cannot discern details of the transaction, the nodes can encrypt the transaction data. An example of cryptography includes, without limitation, symmetric encryption and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can encrypt/decrypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 7, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 7, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

The present specification can be applied to many general-purpose or dedicated computer system environments or configurations, for example, a personal computer, a server computer, a handheld device or a portable device, a tablet device, a multi-processor system, a microprocessor-based system, a set-top box, a programmable consumption electronic device, a network PC, a minicomputer, a mainframe computer, and a distributed computing environment including any one of the previous systems or devices.

The present specification can be described in the general context of computer executable instructions executed by a computer, for example, a program module. Generally, the program module includes a routine, a program, an object, a component, a data structure, etc., executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

Although the present specification is described by using the implementations, a person of ordinary skill in the art knows that many variations of the present specification can be made without departing from the spirit of the present specification. It is expected that the appended claims include these variations without departing from the spirit of the present specification.

What is claimed is:

1. A blockchain-based transaction method, comprising:
calculating a transaction amount commitment based on a commitment random number and a transaction amount involving a remitter account and a remittee account with respect to a blockchain;
obtaining a first commitment random number ciphertext by encrypting the commitment random number based on a homomorphic encryption public key of the remitter account and the transaction amount using a homomorphic encryption algorithm;
obtaining a second commitment random number ciphertext by encrypting the commitment random number based on a homomorphic encryption public key of the remittee account and the transaction amount using the homomorphic encryption algorithm; and
submitting transaction data to the blockchain, the transaction data including the transaction amount commitment, the first commitment random number ciphertext, and the second commitment random number ciphertext, for the transaction amount commitment and the first commitment random number ciphertext to be recorded into the remitter account, and the transaction amount commitment and the second commitment random number ciphertext to be recorded into the remittee account.

2. The method according to claim 1, wherein the remitter account registers a remitter balance commitment and a remitter random number ciphertext in the blockchain; the remitter balance commitment is calculated based on a remitter random number and a remitter balance; the remitter random number ciphertext is obtained by encrypting the remitter random number based on the remitter balance by using the homomorphic encryption algorithm; and
wherein the remittee account registers a remittee balance commitment and a remittee random number ciphertext in the blockchain; the remittee balance commitment is calculated based on a remittee random number and a remittee balance; the remittee random number ciphertext is obtained by encrypting the remittee random number based on the remittee balance by using the homomorphic encryption algorithm.

3. The method according to claim 2, wherein the transaction amount commitment and the first commitment random number ciphertext are recorded into the remitter account by:
updating the remitter balance commitment based on the transaction amount commitment, and updating the remitter random number ciphertext based on the first commitment random number ciphertext; and
wherein the transaction amount commitment and the second commitment random number ciphertext are recorded into the remittee account by:
updating the remittee balance commitment based on the transaction amount commitment, and updating the remittee random number ciphertext based on the second commitment random number ciphertext.

4. The method according to claim 3, wherein an updated remitter balance commitment is a quotient of the remitter balance commitment and the transaction amount commitment; and the updated remitter random number ciphertext is a quotient of the remitter random number ciphertext and the first commitment random number ciphertext; and an updated remittee balance commitment is a product of the remittee balance commitment and the transaction amount commitment; and an updated remittee random number ciphertext is a product of the remittee random number ciphertext and the second commitment random number ciphertext.

5. The method according to claim 1, comprising:
before the submitting the transaction data to the blockchain,
generating a first zero-knowledge proof, the first zero-knowledge proof configured to verify that the transaction amount is not less than 0;
wherein the transaction data includes the first zero-knowledge proof.

6. The method according to claim 1, comprising:
before the submitting the transaction data to the blockchain,
generating a second zero-knowledge proof, the second zero-knowledge proof configured to verify that the transaction amount is not greater than the remitter balance;
wherein the transaction data includes the second zero-knowledge proof.

7. The method according to claim 1, comprising:
before the submitting the transaction data to the blockchain,
generating a third zero-knowledge proof, the third zero-knowledge proof configured to verify that the commitment random number for calculating the transaction amount commitment, the commitment random number for calculating the first commitment random number ciphertext, and the commitment random number for calculating the second commitment random number ciphertext are consistent with one another, and to verify that the transaction amount for calculating the transaction amount commitment, the transaction amount for calculating the first commitment random number ciphertext, and the transaction amount for calculating the second commitment random number ciphertext are consistent with one another;
wherein the transaction data includes the third zero-knowledge proof.

8. The method according to claim 1, comprising:
before the submitting the transaction data to the blockchain,
obtaining a signature data by signing the transaction data using a signature private key of the remitter account;
wherein the transaction data includes the signature data.

9. The method according to claim 1, wherein the calculating the transaction amount commitment based on the commitment random number and the transaction amount includes:
calculating a first transaction amount commitment based on a first commitment random number and a first transaction amount, and calculating a second transaction amount commitment based on a second commitment random number and a second transaction amount;
wherein the obtaining the first commitment random number ciphertext by encrypting the commitment random number based on the homomorphic encryption public key of the remitter account and the transaction amount using the homomorphic encryption algorithm includes:
obtaining the first commitment random number ciphertext by encrypting the first commitment random number based on the homomorphic encryption public key of the remitter account and the first transaction amount using the homomorphic encryption algorithm; and wherein the obtaining the second commitment random number ciphertext by encrypting the commitment random number based on the homomorphic encryption public key of the remittee account and the transaction amount using the homomorphic encryption algorithm includes:

obtaining the second commitment random number ciphertext by encrypting the second commitment random number based on the homomorphic encryption public key of the remittee account and the second transaction amount using the homomorphic encryption algorithm; and wherein the transaction data includes the first transaction amount commitment, the second transaction amount commitment, the first commitment random number ciphertext, and the second commitment random number ciphertext, for the first transaction amount commitment and the first commitment random number ciphertext to be recorded into the remitter account, and the second transaction amount commitment and the second commitment random number ciphertext to be recorded into the remittee account.

10. The method according to claim 9, further comprising:
before the submitting the transaction data to the blockchain,
generating a fourth zero-knowledge proof, the fourth zero-knowledge proof configured to verify that a first transaction amount for calculating the first transaction amount commitment and a second transaction amount for calculating the second transaction amount commitment are consistent with one another;
wherein the transaction data further includes the fourth zero-knowledge proof.

11. A blockchain-based transaction apparatus, comprising:
a calculation unit, configured to calculate a transaction amount commitment based on a commitment random number and a transaction amount involving a remitter account and a remittee account with respect to a blockchain;
a first encryption unit, configured to obtain a first commitment random number ciphertext by encrypting the commitment random number based on a homomorphic encryption public key of the remitter account and the transaction amount using a homomorphic encryption algorithm;
a second encryption unit, configured to obtain a second commitment random number ciphertext by encrypting the commitment random number based on a homomorphic encryption public key of the remittee account and the transaction amount using the homomorphic encryption algorithm; and
a submission unit, configured to submit transaction data to the blockchain, the transaction data including the transaction amount commitment, the first commitment random number ciphertext, and the second commitment random number ciphertext, for the transaction amount commitment and the first commitment random number ciphertext to be recorded into the remitter account, and the transaction amount commitment and the second commitment random number ciphertext to be recorded into the remittee account.

12. A remitter device, comprising:
a memory, configured to store computer instructions; and
a processor, configured to execute the computer instructions to implement acts including:
calculating a transaction amount commitment based on a commitment random number and a transaction amount involving a remitter account and a remittee account with respect to a blockchain;
obtaining a first commitment random number ciphertext by encrypting the commitment random number based on a homomorphic encryption public key of a the remitter account and the transaction amount using a homomorphic encryption algorithm;
obtaining a second commitment random number ciphertext by encrypting the commitment random number based on a homomorphic encryption public key of a the remittee account and the transaction amount using the homomorphic encryption algorithm; and
submitting transaction data to a the blockchain, the transaction data including the transaction amount commitment, the first commitment random number ciphertext, and the second commitment random number ciphertext, for the transaction amount commitment and the first commitment random number ciphertext to be recorded into the remitter account, and the transaction amount commitment and the second commitment random number ciphertext to be recorded into the remittee account.

13. The device according to claim 12, wherein the remitter account registers a remitter balance commitment and a remitter random number ciphertext in the blockchain; the remitter balance commitment is calculated based on a remitter random number and a remitter balance; the remitter random number ciphertext is obtained by encrypting the remitter random number based on the remitter balance by using the homomorphic encryption algorithm; and
wherein the remittee account registers a remittee balance commitment and a remittee random number ciphertext in the blockchain; the remittee balance commitment is calculated based on a remittee random number and a remittee balance; the remittee random number ciphertext is obtained by encrypting the remittee random number based on the remittee balance by using the homomorphic encryption algorithm.

14. The device according to claim 13, wherein the transaction amount commitment and the first commitment random number ciphertext are recorded into the remitter account by:
updating the remitter balance commitment based on the transaction amount commitment, and updating the remitter random number ciphertext based on the first commitment random number ciphertext; and
wherein the transaction amount commitment and the second commitment random number ciphertext are recorded into the remittee account by:
updating the remittee balance commitment based on the transaction amount commitment, and updating the remittee random number ciphertext based on the second commitment random number ciphertext.

15. The device according to claim 14, wherein an updated remitter balance commitment is a quotient of the remitter balance commitment and the transaction amount commitment; and the updated remitter random number ciphertext is a quotient of the remitter random number ciphertext and the first commitment random number ciphertext; and an updated remittee balance commitment is a product of the remittee balance commitment and the transaction amount commitment; and an updated remittee random number ciphertext is a product of the remittee random number ciphertext and the second commitment random number ciphertext.

16. The device according to claim 12, wherein the acts includes:
   before the submitting the transaction data to the blockchain,
      generating a first zero-knowledge proof, the first zero-knowledge proof configured to verify that the transaction amount is not less than 0;
   wherein the transaction data includes the first zero-knowledge proof.

17. The device according to claim 12, comprising:
   before the submitting the transaction data to the blockchain,
      generating a second zero-knowledge proof, the second zero-knowledge proof configured to verify that the transaction amount is not greater than the remitter balance;
   wherein the transaction data includes the second zero-knowledge proof.

18. The method according to claim 12, wherein the acts include:
   before the submitting the transaction data to the blockchain,
      generating a third zero-knowledge proof, the third zero-knowledge proof configured to verify that the commitment random number for calculating the transaction amount commitment, the commitment random number for calculating the first commitment random number ciphertext, and the commitment random number for calculating the second commitment random number ciphertext are consistent with one another, and to verify that the transaction amount for calculating the transaction amount commitment, the transaction amount for calculating the first commitment random number ciphertext, and the transaction amount for calculating the second commitment random number ciphertext are consistent with one another;
   wherein the transaction data includes the third zero-knowledge proof.

19. The device according to claim 12, wherein the acts include:
   before the submitting the transaction data to the blockchain,
      obtaining a signature data by signing the transaction data using a signature private key of the remitter account;
   wherein the transaction data includes the signature data.

20. The device according to claim 12, wherein the calculating the transaction amount commitment based on the commitment random number and the transaction amount includes:
   calculating a first transaction amount commitment based on a first commitment random number and a first transaction amount, and calculating a second transaction amount commitment based on a second commitment random number and a second transaction amount;
   wherein the obtaining the first commitment random number ciphertext by encrypting the commitment random number based on the homomorphic encryption public key of the remitter account and the transaction amount using the homomorphic encryption algorithm includes:
   obtaining the first commitment random number ciphertext by encrypting the first commitment random number based on the homomorphic encryption public key of the remitter account and the first transaction amount using the homomorphic encryption algorithm; and
   wherein the obtaining the second commitment random number ciphertext by encrypting the commitment random number based on the homomorphic encryption public key of the remittee account and the transaction amount using the homomorphic encryption algorithm includes:
   obtaining the second commitment random number ciphertext by encrypting the second commitment random number based on the homomorphic encryption public key of the remittee account and the second transaction amount using the homomorphic encryption algorithm; and
   wherein the transaction data includes the first transaction amount commitment, the second transaction amount commitment, the first commitment random number ciphertext, and the second commitment random number ciphertext, for the first transaction amount commitment and the first commitment random number ciphertext to be recorded into the remitter account, and the second transaction amount commitment and the second commitment random number ciphertext to be recorded into the remittee account.

* * * * *

UNITED STATES PATENT AND TRADEMARK OFFICE
CERTIFICATE OF CORRECTION

| | |
|---|---|
| PATENT NO. | : 11,050,549 B2 |
| APPLICATION NO. | : 17/079356 |
| DATED | : June 29, 2021 |
| INVENTOR(S) | : Wenbin Zhang et al. |

It is certified that error appears in the above-identified patent and that said Letters Patent is hereby corrected as shown below:

In the Claims

Column 23, Line 25, Claim 18:
"The method" should read, --The device--.

Signed and Sealed this
Nineteenth Day of October, 2021

Drew Hirshfeld
*Performing the Functions and Duties of the
Under Secretary of Commerce for Intellectual Property and
Director of the United States Patent and Trademark Office*